US010641159B2

(12) United States Patent
Graham et al.

(10) Patent No.: US 10,641,159 B2
(45) Date of Patent: May 5, 2020

(54) PRE-CHAMBER ASSEMBLY FOR FUEL INJECTOR

(71) Applicant: Caterpillar Inc., Peoria, IL (US)

(72) Inventors: Curtis J. Graham, Peoria, IL (US); Daniel Cavanaugh, Chillicothe, IL (US); Kevin P. Reardon, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 279 days.

(21) Appl. No.: 15/274,343

(22) Filed: Sep. 23, 2016

(65) Prior Publication Data
US 2018/0087447 A1 Mar. 29, 2018

(51) Int. Cl.
| F02B 19/16 | (2006.01) |
| F02B 19/10 | (2006.01) |
| F02B 19/12 | (2006.01) |
| F02M 61/16 | (2006.01) |
| F02M 57/00 | (2006.01) |

(52) U.S. Cl.
CPC ............ *F02B 19/16* (2013.01); *F02B 19/108* (2013.01); *F02B 19/12* (2013.01); *F02M 61/168* (2013.01); *F02M 57/00* (2013.01); *F02M 2200/8084* (2013.01); *Y02T 10/125* (2013.01)

(58) Field of Classification Search
CPC ........ F02B 19/16; F02B 19/12; F02B 19/108; F02M 57/00; F02M 61/168; F02M 2200/8084; Y02T 10/125
USPC ................................................. 123/253, 273
See application file for complete search history.

(56) References Cited

U.S. PATENT DOCUMENTS

| 1,678,897 | A | * | 7/1928 | Adams | F02B 19/14 |
| | | | | | 123/259 |
| 1,719,643 | A | * | 7/1929 | Barnaby | F02B 19/14 |
| | | | | | 123/273 |
| 1,762,550 | A | * | 6/1930 | French | F02B 19/14 |
| | | | | | 123/271 |
| 2,999,484 | A | * | 9/1961 | Lusznat | F02B 19/14 |
| | | | | | 123/270 |
| 3,035,559 | A | * | 5/1962 | Brandes | F02B 3/00 |
| | | | | | 123/269 |

(Continued)

FOREIGN PATENT DOCUMENTS

| EP | 2205840 | 2/2012 |
| FR | 2335705 | 7/1977 |

(Continued)

OTHER PUBLICATIONS

McCallum-Boles, Ann; Thread Type Identification Guide: NPT, BSP, JIS, SAE, Metric; Apr. 4, 2016; TrimanTec (tm); TecTalk Blog entry, printed to pdf; pp. 4-8 of pdf.*

*Primary Examiner* — Phutthiwat Wongwian
*Assistant Examiner* — Susan E Scharpf
(74) *Attorney, Agent, or Firm* — Brannon Sowers & Cracraft PC

(57) ABSTRACT

A pre-chamber for a fuel injector is disclosed. The pre-chamber includes a cylindrical body member extending axially from a first end portion to a second end portion opposite to the first end portion. The pre-chamber further includes a bottom plate located proximal to the first end portion of the cylindrical body member. The pre-chamber also includes a sacrificial member extending axially outwards from the second end portion of the cylindrical body member.

15 Claims, 7 Drawing Sheets

(56) References Cited

U.S. PATENT DOCUMENTS

| | | | | |
|---|---|---|---|---|
| 4,044,730 | A * | 8/1977 | Masaaki | F02B 19/1066 123/268 |
| 4,072,134 | A * | 2/1978 | Noguchi | F02B 19/1066 123/260 |
| 4,098,232 | A * | 7/1978 | Gleiter | F02B 19/1004 123/261 |
| 4,256,071 | A * | 3/1981 | Casull | F02B 19/12 123/266 |
| 4,676,207 | A * | 6/1987 | Kawamura | F02B 19/165 123/213 |
| 5,533,476 | A * | 7/1996 | Anderson | F02B 19/1009 123/267 |
| 5,628,288 | A * | 5/1997 | Masuda | F02B 19/16 123/273 |
| 5,799,637 | A * | 9/1998 | Cifuni | H01T 13/54 123/169 PA |
| 5,934,244 | A * | 8/1999 | Walenta | F02B 19/16 123/261 |
| 7,770,552 | B2 * | 8/2010 | Schultz | F02B 19/12 123/143 B |
| 8,757,129 | B1 * | 6/2014 | Hill | F02B 31/04 123/297 |
| 9,476,347 | B2 * | 10/2016 | Chiera | F02B 19/12 |
| 9,732,664 | B2 * | 8/2017 | Trinkel | F02B 19/16 |
| 9,751,143 | B2 * | 9/2017 | Kimura | B23K 1/0012 |
| 9,893,497 | B2 * | 2/2018 | Chiera | H01T 13/54 |
| 10,052,715 | B2 * | 8/2018 | Raven | B23K 20/129 |
| 2002/0030083 | A1 * | 3/2002 | Engelhard | B23K 20/123 228/112.1 |
| 2008/0283253 | A1 * | 11/2008 | Buytaert | E21B 17/1028 166/381 |
| 2008/0309057 | A1 | 12/2008 | Richter et al. | |
| 2009/0053551 | A1 * | 2/2009 | Sakamoto | C21D 9/46 428/603 |
| 2010/0009142 | A1 * | 1/2010 | Quandt | A61L 27/06 428/209 |
| 2011/0148274 | A1 * | 6/2011 | Ernst | H01T 13/467 313/141 |
| 2012/0125287 | A1 * | 5/2012 | Chiera | F02B 19/12 123/254 |
| 2013/0042834 | A9 * | 2/2013 | Chiera | F02B 19/12 123/254 |
| 2013/0139784 | A1 * | 6/2013 | Pierz | F02B 19/1009 123/254 |
| 2014/0225497 | A1 | 8/2014 | Woerner et al. | |
| 2015/0176341 | A1 * | 6/2015 | Hughes | E21B 17/046 166/65.1 |
| 2015/0246394 | A1 * | 9/2015 | Lancaster-Larocque | B22F 3/24 381/332 |
| 2016/0039042 | A1 * | 2/2016 | Riggs | B23K 20/129 405/170 |
| 2016/0053667 | A1 | 2/2016 | Loetz et al. | |
| 2017/0080519 | A1 * | 3/2017 | Atin | B23K 37/0276 |
| 2017/0129048 | A1 * | 5/2017 | Raven | B23K 20/129 |
| 2018/0029157 | A1 * | 2/2018 | Bray | F01D 5/063 |

FOREIGN PATENT DOCUMENTS

| | | |
|---|---|---|
| GB | 2127097 | 4/1984 |
| WO | 2006138712 | 12/2006 |
| WO | 2009114327 | 9/2009 |
| WO | 2012113002 | 8/2012 |

* cited by examiner

PRE-CHAMBER ASSEMBLY FOR FUEL INJECTOR

TECHNICAL FIELD

The present disclosure relates to fuel injectors of internal combustion engine, and more particularly to a pre-chamber assembly for a fuel injector of an internal combustion engine.

BACKGROUND

In order to improve utilization of fuel, a pre-chamber assembly is provided in a fuel injector of an engine. The pre-chamber assembly includes a body portion and a pre-chamber. The pre-chamber assembly is coupled to the cylinder head and is in fluid communication with a combustion chamber of the engine. The body portion is preferably made of a material such as cast iron and the pre-chamber is preferably made using material such as an alloy of iron. Generally, the pre-chamber is attached to the body portion via a welding process such as laser welding. The laser welding incurs higher cost and further requires a complicated manufacturing set up. Further, the laser welding involves forming a weld seam using a third material, different from the material of the body portion and the material of the pre-chamber, for coupling the pre-chamber to the body portion.

US Patent Publication number US2014/225497 ('497 patent publication) discloses a pre-chamber module for a laser spark plug. The pre-chamber module has a fastening region for the detachable fastening of the pre-chamber module to the laser spark plug. The pre-chamber module includes a diaphragm arrangement in an end region facing away from the combustion chamber. The diaphragm arrangement borders on an inner chamber of the pre-chamber module in the axial direction. The diaphragm arrangement has an orifice for the irradiation of laser radiation from the laser spark plug into the inner chamber of the pre-chamber module. However, the '497 patent publication fails to reduce the cost and efficiency of the manufacturing process of the pre-chamber assembly.

SUMMARY OF THE DISCLOSURE

In one aspect of the present disclosure a pre-chamber for a fuel injector is provided. The pre-chamber includes a cylindrical body member extending axially from a first end portion to a second end portion opposite to the first end portion. The pre-chamber further includes a bottom plate located proximal to the first end portion of the cylindrical body member. The pre-chamber further includes a sacrificial member extending axially outwardly from the second end portion of the cylindrical body member.

In another aspect of the present disclosure, a fuel injector for an engine is provided. The fuel injector includes a body portion, having a bottom surface, adapted to receive fuel from a fuel supply system of the engine. The fuel injector further includes a pre-chamber attached to the bottom surface of the body portion. The pre-chamber includes a cylindrical body member extending axially from a first end portion to a second end portion opposite to the first end portion. The pre-chamber further includes a bottom plate located proximal to the first end portion of the cylindrical body member. The pre-chamber also includes a sacrificial member extending axially outwardly from the second end portion of the cylindrical body member.

In yet another aspect of the present disclosure, a method of joining a body portion of the fuel injector with a pre-chamber is provided. The method includes aligning the body portion with the pre-chamber. The method includes applying axial force on the body portion and the pre-chamber. The method further includes melting a sacrificial portion of the pre-chamber to join the body portion with the pre-chamber.

Other features and aspects of this disclosure will be apparent from the following description and the accompanying drawings.

DETAILED DESCRIPTION

Figure 1:
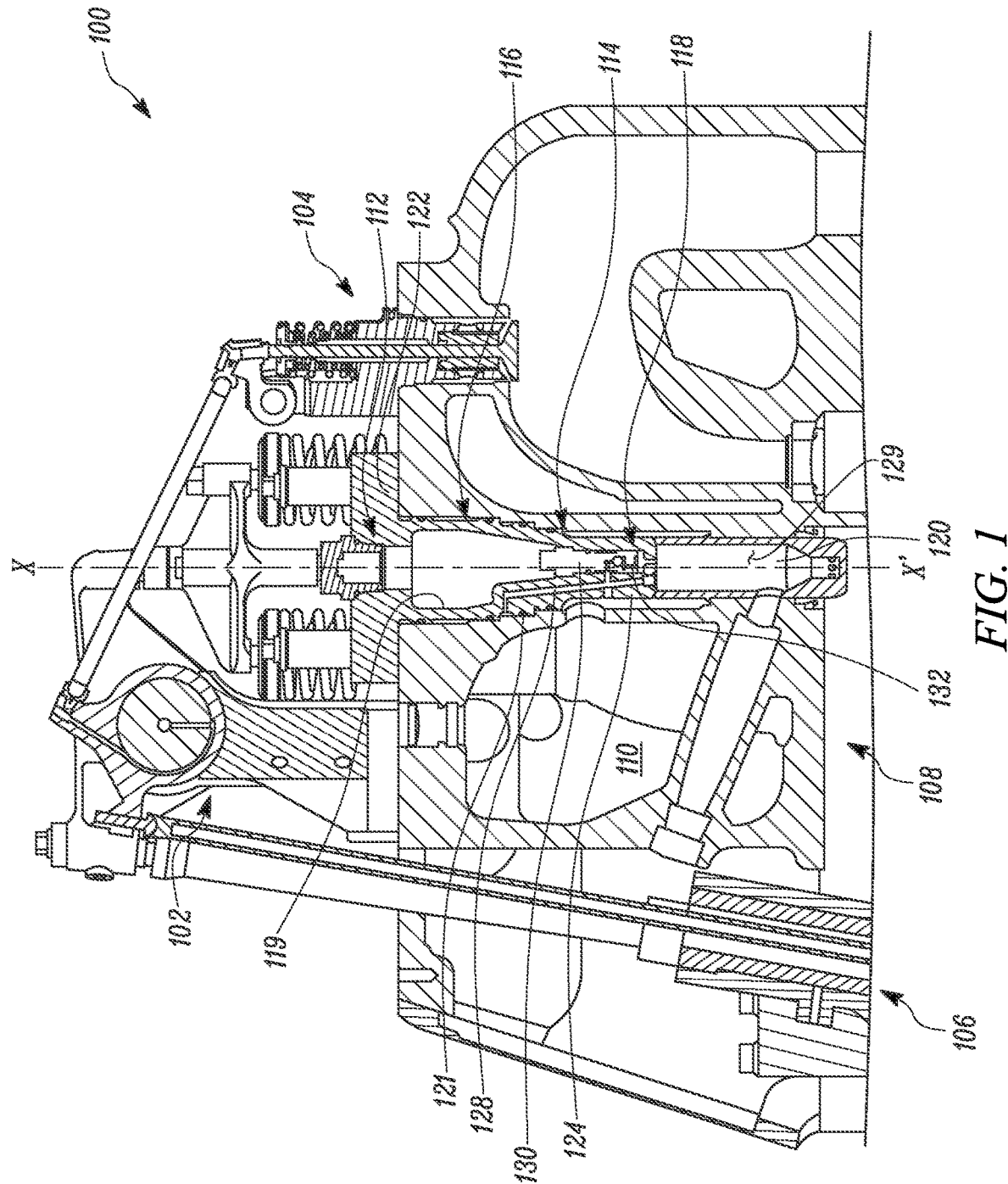
FIG. 1 is a sectional view of a portion of an engine having a pre-chamber assembly, according to one embodiment of the present disclosure.

Wherever possible, the same reference numbers will be used throughout the drawings to refer to the same or the like parts. FIG. 1 illustrates a sectional view of a portion of an internal combustion engine 100. The internal combustion engine 100, also referred to as "engine 100" may embody a compression ignition engine, a spark-ignition engine, or any type of combustion engine known to one skilled in the art. The engine 100 may be used in various applications such as, but not limited to, transportation, for example, in off-highway trucks, in earth-moving machines, or for power generation, for example, when coupled to a generator set, or to drive turbo-machines or other equipment such as, pumps, compressors, and other devices known in the art.

The engine 100 includes an engine housing 102. The engine housing 102 includes a cylinder head 104 and a cylinder block 106 on which the cylinder head 104 is positioned. The cylinder block 106 may include a number of cylinders (not shown). Each of the number of cylinders, hereinafter referred to as the cylinder, defines a main combustion chamber 108 for receiving an air-fuel mixture for combustion. A piston (not shown) having a piston head (not shown) is disposed within the cylinder to reciprocate therein. Typically, the piston reciprocates from a bottom dead center (BDC) to a top dead center (TDC) in multiple cycles. A volume between the TDC and the BDC defines a swept volume indicative of a volume available for a combusted charge to occupy. Accordingly, when the piston is at the TDC, volume available between the piston head and an inner portion of the cylinder head 104 functions as the main combustion chamber 108. Although not shown, the engine 100 may also include other components such as a crankshaft, an inlet valve, an exhaust valve, an exhaust manifold, and an after-treatment system. In an embodiment, the cylinder head 104 defines a coolant passage 110. The coolant passage 110 is adapted to receive coolants for dissipating heat generated during operation of the engine 100.

The cylinder head 104 is equipped with a fuel injector 112. The fuel injector 112 includes a pre-chamber assembly 114. The pre-chamber assembly 114 is an auxiliary device that accommodates a secondary chamber 129, and is provided in the cylinder head 104 to increase the volume of the main combustion chamber 108. The pre-chamber assembly 114 facilitates an ignition of the air-fuel mixture in the main combustion chamber 108. The pre-chamber assembly 114 is disposed in a recess 116 defined in the cylinder head 104. In an example, the pre-chamber assembly 114 may extend into the main combustion chamber 108. In another example, the pre-chamber assembly 114 may be formed as an inbuilt device with the cylinder head 104. In yet another example, the pre-chamber assembly 114 may be a separate device that is configured to fit within the cylinder head 104. It will be appreciated that the pre-chamber assembly 114 may be mounted on the cylinder head 104 by any other manner known to a person skilled in the art.

The pre-chamber assembly 114 includes a body portion 118 and a pre-chamber 120. The body portion 118 is received within the recess 116 of the cylinder head 104. The body portion 118 defines a longitudinal axis X-X' along a length of the body portion 118. The body portion 118 includes an inner surface 119 and an outer surface 121. In an example, the body portion 118 may be made of cast iron. In alternative examples, the body portion 118 may be made of aluminum alloys, or any other suitable material known in the art.

Figure 2:
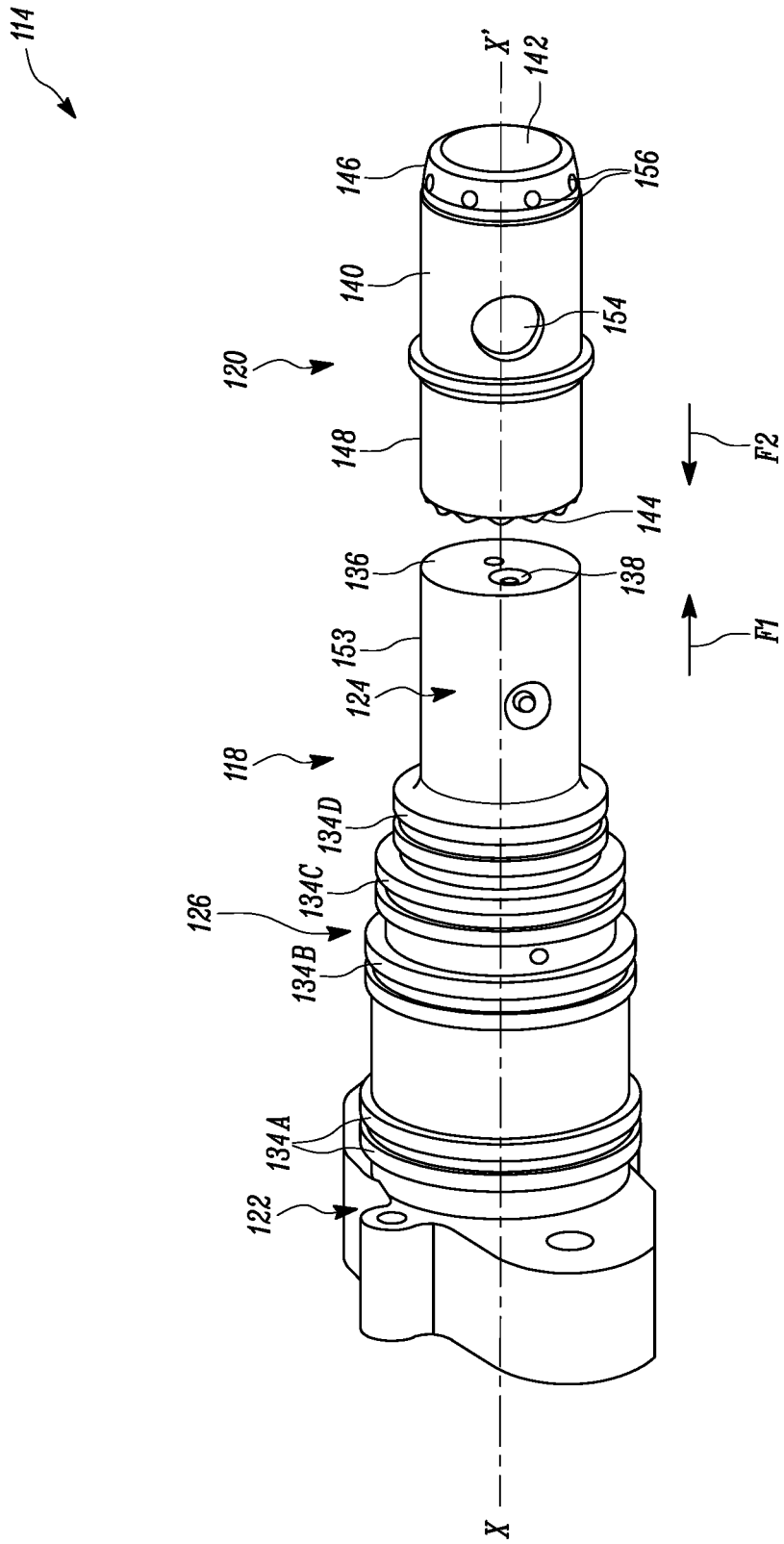
FIG. 2 is an exploded view of the pre-chamber assembly of the engine of FIG. 1, according to one embodiment of the present disclosure.

FIG. 2 illustrates an exploded view of the pre-chamber assembly 114, according to one embodiment of the present disclosure. Referring to FIG. 1 and FIG. 2, the body portion 118 includes a top end portion 122, a bottom end portion 124 spaced apart from the top end portion 122, and an intermediate portion 126 disposed between the top end portion 122 and the bottom end portion 124. The top end portion 122 is coupled to the cylinder head 104 of the engine 100 by fastening devices (not shown).

The intermediate portion 126 extends along the longitudinal axis X-X' from the top end portion 122 towards the main combustion chamber 108. The intermediate portion 126 includes a fuel passage 128 to controllably inject fuel into the pre-chamber 120. The fuel passage 128 is in fluid communication with a fuel supply system (not shown) of the engine 100. It will be understood by the person skilled in the art that the fuel injection may be assisted by a fuel pump, a fuel accumulator, a fuel filter, and a fuel distributor.

The intermediate portion 126 further includes a valve receiving bore 130 (shown in FIG. 1) adapted to receive a fuel admission valve 132 (shown in FIG. 1). The fuel admission valve 132 engages with a threaded section (not shown) of the intermediate portion 126 such that the fuel admission valve 132 is retained within the valve receiving bore 130. The fuel admission valve 132 is in fluid communication with the fuel passage 128 to control the fuel flow through the fuel passage 128. Further, the fuel admission valve 132 is in operative communication with a controller (not shown). The intermediate portion 126 is also in contact with the coolant flowing via the coolant passage 110. The intermediate portion 126 also includes four annular grooves (not shown) defined on the outer surface 121 of the body portion 118. The annular grooves may be axially spaced apart from each other along the longitudinal axis X-X' of the body portion 118. The annular grooves are configured to receive four O-ring members 134A, 134B, 134C, and 134D, respectively, for preventing leakage of the coolant from the coolant passage 110.

The bottom end portion 124 is partially received within the recess 116 defined in the cylinder head 104. The bottom end portion 124 of the body portion 118 extends along the longitudinal axis X-X' of the body portion 118 from the intermediate portion 126 towards the main combustion chamber 108. The bottom end portion 124 includes a bottom surface 136 (shown in FIG. 3) of the body portion 118. The pre-chamber 120 of the pre-chamber assembly 114 extends axially from the bottom surface 136 of the body portion 118. An outlet 138 of the fuel admission valve 132 is disposed at the bottom surface 136 of the body portion 118 for supplying fuel to the pre-chamber 120. The pre-chamber 120 is in fluid communication with the main combustion chamber 108.

Figure 3:
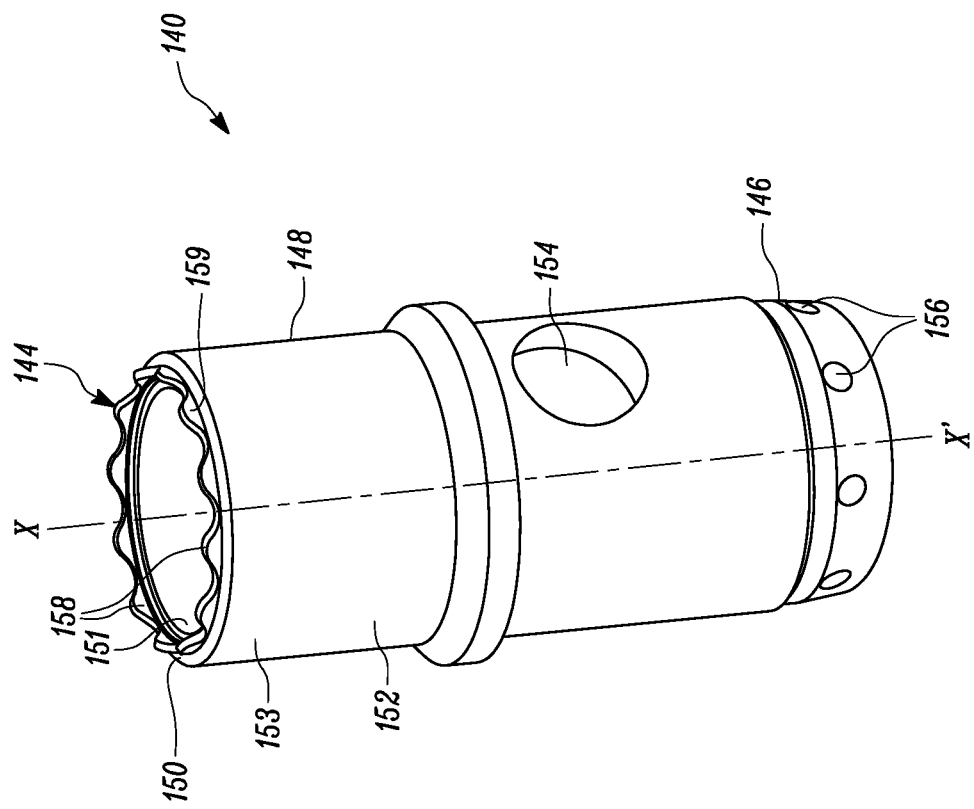
FIG. 3 is an enlarged view of the pre-chamber of FIG. 2.

Referring to FIG. 3, an enlarged view of the pre-chamber 120 is illustrated. In an example, the pre-chamber 120 may be made of cast iron, aluminum alloys, or any other material known in the art. The pre-chamber 120 includes a cylindrical body member 140, a bottom plate 142, and a sacrificial member 144. The cylindrical body member 140 is coaxially disposed along the longitudinal axis X-X' of the body portion 118 of the pre-chamber assembly 114. The cylindrical body member 140 includes a first end portion 146 and a second end portion 148 opposite to the first end portion 146. The second end portion 148 extends axially from the first end portion 146 to the second end portion 148. The first end portion 146 can be understood as a region being proximal to the main combustion chamber 108. The second end portion 148 can be understood as a region proximal to the body portion 118. The second end portion 148 includes a second end surface 150. A wall 152 of the cylindrical body member 140 is defined between an inner surface 151 and an outer surface 153 of the cylindrical body member 140. A distance between the inner surface 151 and the outer surface 153 defines a thickness of the cylindrical body member 140. A hole 154 is provided in the wall 152 of the cylindrical body portion 140, proximal to the first end portion 146 of the pre-chamber 120 for receiving a spark plug therein. The hole 154 may include threads to fasten the spark plug therein. The spark plug is so positioned in the pre-chamber 120, such that a tip of the spark plug is proximal to the first end portion 146 of the pre-chamber 120. For the purpose of supplying the air-fuel mixture to the main combustion chamber 108 multiple ports 156 are provided at the first end portion 146 of the cylindrical body member 140. In other words, the ports 156 are formed in the wall 152 of the cylindrical body member 140.

The bottom plate 142 (shown In FIG. 2) is located proximal to the first end portion 146 of the cylindrical body member 140. In one example, a diameter of the bottom plate 142 confirms an outer diameter of the cylindrical body member 140. In one example, the bottom plate 142 is attached to the first end portion 146 of the cylindrical body member 140. It will be appreciated that the bottom plate 142 may be attached to the first end portion 146 of the cylindrical body member 140 by any other manner known to the person skilled in the art.

The sacrificial member 144 extends along the longitudinal axis X-X' from the second end surface 150 of the cylindrical body member 140. More specifically, the sacrificial member 144 extends axially outwards from the second end portion 148 of the cylindrical body member 140, is centered on the longitudinal axis X-X' extends circumferentially around an opening to chamber 129, and forms a tip of the cylindrical body member 140. In one example, the sacrificial member 144 may be formed as an inbuilt part with the cylindrical body member 140. In another example, the sacrificial member 144 may be a separate member that is configured to fit on the second end portion 148 of the cylindrical body member 140. In one embodiment, an outer diameter of the sacrificial member 144 is less than an outer diameter of the cylindrical body member 140. In another embodiment, the outer diameter of the sacrificial member 144 is equal to the outer diameter of the cylindrical body member 140

The sacrificial member 144 includes a plurality of sacrificial tabs 158. Each of the sacrificial tabs 158 are spaced apart at a distance from each other on the second end surface 150 of the cylindrical body member 140. In one example, the sacrificial tabs 158 are disposed spaced apart at an equal distance at the second end surface 150 of the cylindrical body member 144. The sacrificial tabs 158 are substantially semicircular in shape. However, it may be understood by the person skilled in the art that the sacrificial tabs 158 can be of various shapes, such as rectangular shape, triangular shape, and curvilinear shape. The sacrificial tabs 158 have dimensional characteristics including, but not limited to, a predefined height and a predefined thickness. In one embodiment, the predefined thickness of the sacrificial tabs 158 may be less than the thickness of the cylindrical body member 140. The predefined height and the predefined thickness of the sacrificial tabs 158 may be defined based on factors including, but not limited to, material of the pre-chamber 120, and material of the body portion 118, explained in detail with respect to FIG. 5 and FIG. 6.

In the present embodiment, the sacrificial tabs 158 are attached with the bottom surface 136 of the body portion 118 of the pre-chamber assembly 114. In order to attach the pre-chamber 120 with the bottom surface 136 of the body portion 118, the sacrificial tabs 158 are melted at a predefined temperature. The predefined temperature may be defined based on the material of the pre-chamber 120. For example, the pre-chamber 120 made of aluminum alloys, such as Inconel, may have a melting point ranging from 500° C. to 750° C. The predefined temperature may also vary based on the predefined height and the predefined thickness of the sacrificial tabs 158. In one embodiment of present disclosure, the sacrificial tabs 158 are configured to attach by at least one of a resistance welding and a friction welding, to attach with the bottom surface 136 of the body portion 118 of the pre-chamber assembly 114.

Figure 4:
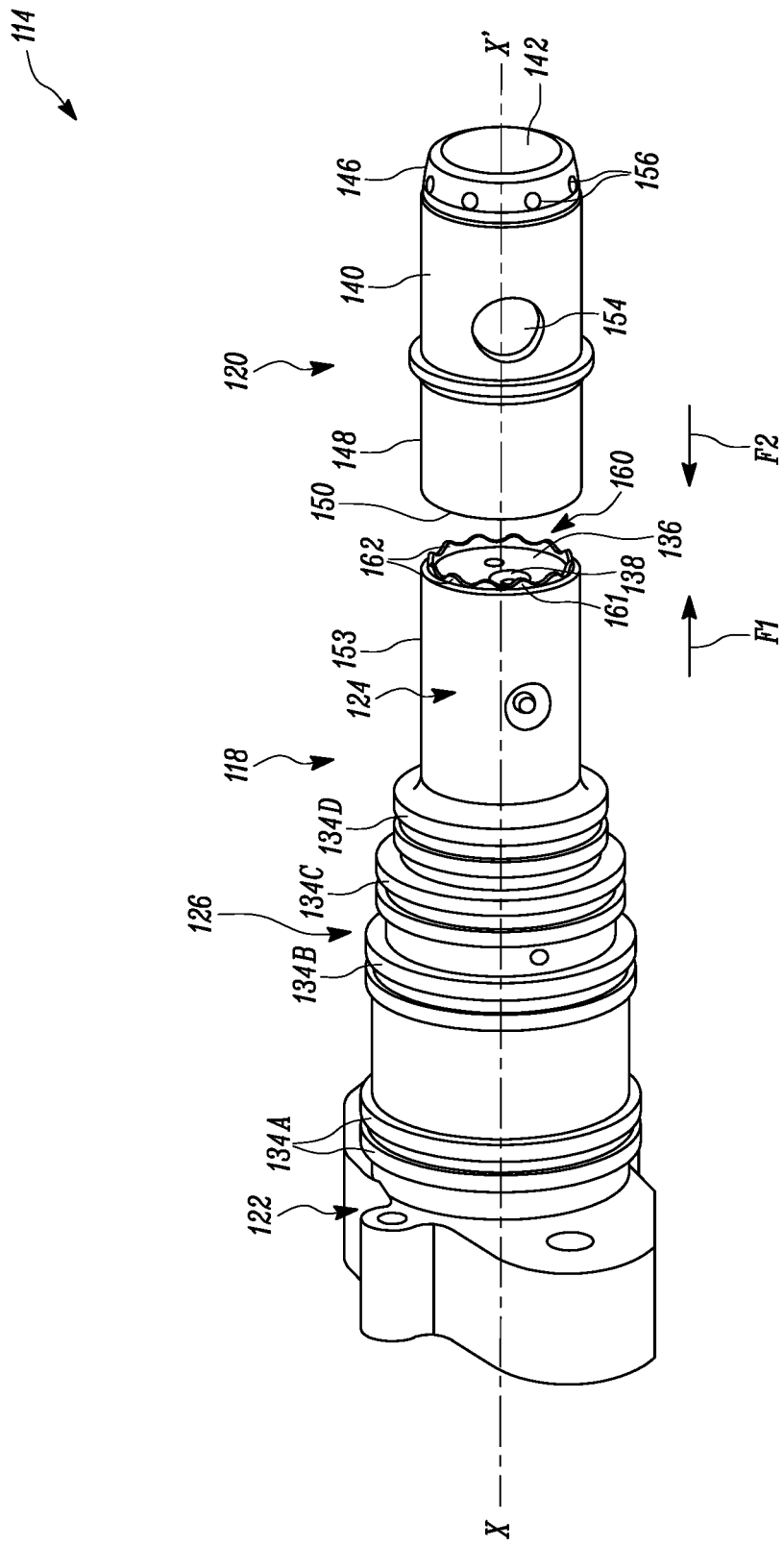
FIG. 4 is an exploded view of the pre-chamber assembly of the engine of FIG. 1, according to another embodiment of the present disclosure.

In an alternative embodiment of the present disclosure, as illustrated in FIG. 4, a sacrificial member 160 may be present at the bottom surface 136 of the body portion 118. FIG. 4 illustrates an exploded view of the pre-chamber assembly 114 of the engine 100 of FIG. 1, according to another embodiment of the present disclosure. For the sake of brevity, the aspects of the present disclosure which are already explained in detail in the description of FIG. 2 and FIG. 3 are not explained in detail with regard to the description of FIG. 4. The sacrificial member 160 extends axially downwards from the bottom surface 136 of the body portion 118. More specifically, the sacrificial member 160 extends along the longitudinal axis X-X' of the body portion 118. In one example, the sacrificial member 160 may be formed as an inbuilt part with the body portion 118. In another example, the sacrificial member 160 may be a separate member that is configured to fit on the bottom surface 136 of the body portion 118. In one embodiment, an outer diameter of the sacrificial member 160 is less than an outer diameter of the body portion 118.

The sacrificial member 160 includes a plurality of sacrificial tabs 162. The sacrificial tabs 162 are substantially semicircular in shape. However, it may be understood by the person skilled in the art that the sacrificial tabs 162 can be of various shapes, such as rectangular shape, triangular shape, curvilinear shape without limiting the scope of the present disclosure. The sacrificial tabs 162 are disposed spaced apart at an equal distance at the bottom surface 136 of the body portion 118. The sacrificial tabs 162 have a predefined height and a predefined thickness. The predefined height and the predefined thickness of the sacrificial tabs 162 may be defined based on factors including, but not limited to, material of the pre-chamber 120, and material of the body portion 118.

In the present embodiment, the sacrificial tabs 162 are configured to attach with the second end surface 150 of the cylindrical body member 140 of the pre-chamber 120. In order to attach with the second end surface 150 of the cylindrical body member 140, the sacrificial tabs 162 are configured to melt at a predefined temperature. The predefined temperature may be defined based on the material of the pre-chamber 120. The predefined temperature may also vary based on the predefined height and the predefined thickness of the sacrificial tabs 162. In one embodiment of present disclosure, the sacrificial tabs 162 are configured to melt by at least one of a resistance welding and a friction welding to attach with the sacrificial tabs 162 of the body portion 118. In another embodiment, the sacrificial tabs 162 may be present at the bottom surface 136 of the body portion 118 and the second end surface 150 of the cylindrical body member 140.

Figure 5:
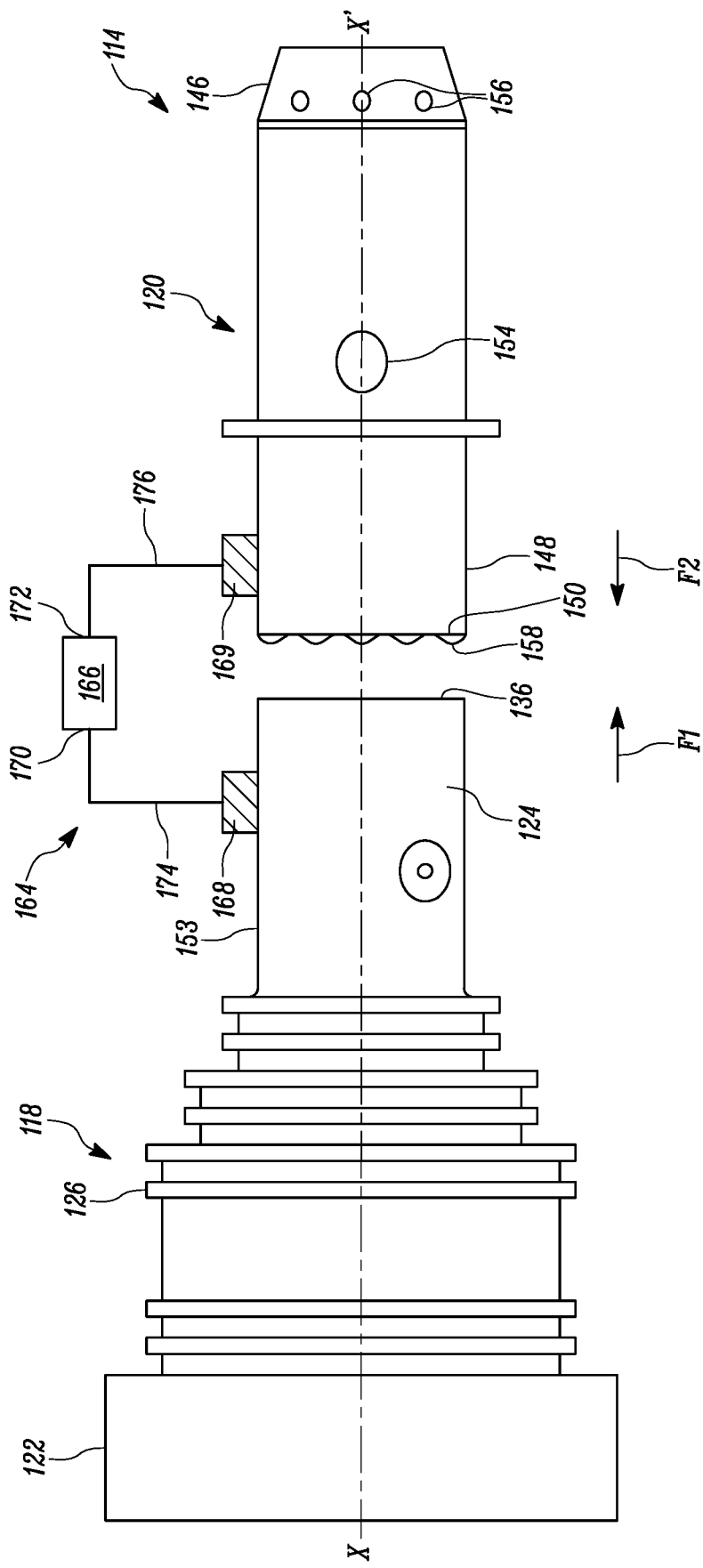
FIG. 5 is a schematic view of an exemplary set up for manufacturing the pre-chamber assembly via resistance welding, according to yet another embodiment of the present disclosure.

Referring to FIG. 5, an exemplary system 164 for manufacturing the pre-chamber assembly 114 via resistance welding is shown. The system 164 is connected to the body portion 118 and the pre-chamber 120. For the sake of brevity, the present disclosure will be described in connection to the sacrificial tabs 158 of the pre-chamber 120, although it will be understood that the present disclosure is also applicable to the sacrificial tabs 162 of the body portion 118.

The system 164 includes a power source 166 and a first electrode 168 and a second electrode 169. The first and the second electrodes 168, 169 are connected to the power source 166. The power source 166 is provided to supply a predetermined electric current to the sacrificial tabs 158 through the first and the second electrodes 168, 169. The power source 166 includes a first terminal 170 and a second terminal 172. The first terminal 170 is connected to the first electrode 168, 169, via a first terminal connection 174. The second terminal 172 is connected to the second electrode 168, 169, via a second terminal connection 176. The first electrode 168 is positioned on the body portion 118. The second electrode 169 is positioned on the pre-chamber 120. In an example, the electrode 168 may be made of copper or any other material known in the art. Operational characteristics, such as electrode material, shape, size, tip profile and cooling, of the first and the second electrodes 168, 169 may vary based on a material of the pre-chamber 120 and a material of the body portion 118.

The system 164 is configured to connect the pre-chamber 120 and the bottom surface 136 of the body portion 118. More specifically, the system 164 is provided for performing a welding process, such as a resistance welding process, to fuse the sacrificial tabs 158 with the bottom end portion 124 of the body portion 118. A predetermined axial force and the predetermined electric current are applied to the pre-chamber 120 for melting the sacrificial tabs 158 to join the pre-chamber 120 with the body portion 118.

In order to perform the welding process, the pre-chamber 120 and the body portion 118 are aligned along the longitudinal axis X-X'. Further, the system 164 is configured to apply a predetermined axial force. More specifically, the system 164 may apply a predetermined axial force F1 on the body portion 118 in the pre-chamber 120 along the longitudinal axis X-X' of the body portion 118. The system 164 may apply a predetermined axial force 'F2' in an opposite direction of the predetermined axial force 'F1' towards the body portion 118. The predetermined axial force 'F2' is applied opposite to the longitudinal axis X-X' of the body portion 118. In one example, the predetermined axial force may be mechanically applied by the system 164 on the pre-chamber 120. In another example, the predetermined axial force may be hydraulically applied by the system 164 on the pre-chamber 120. In yet another example, the predetermined axial force may be pneumatically applied by the system 164 on the pre-chamber 120. The predetermined axial force applied to the pre-chamber 120 is determined based on the dimensional characteristics of the sacrificial tabs 158 such as the predefined height and the predefined thickness of the sacrificial tabs 158. The predetermined axial force applied to the pre-chamber 120 is also selected based on the predetermined electric current applied to the pre-chamber 120. In an example, the predetermined axial force may be in terms of pressure applied on the pre-chamber 120.

The predetermined electric current 'I' is applied to the pre-chamber 120 and the body portion 118 generates heat according to following equation:

$$Q=I^2RtK$$

where Q is the heat generated during the resistance welding process. The heat 'Q' is generated when the predetermined current 'I' flows through the sacrificial tabs 158 and the body portion 118 having a resistance 'R' and a thermal constant 'K' for a predefined time 't'. The resistance 'R' may depend on the dimensional characteristics of the sacrificial tabs 158. The resistance 'R' may also depend on a bottom surface condition of the body portion 118 and/or the sacrificial tabs 158 including, but not limited to, surface roughness, cleanliness of the surface, oxidation of the surface, and plating of the surface. The generated heat increases the temperature of the sacrificial tabs 158. Once the pre-chamber 120 is heated up to the predetermined temperature, the sacrificial tabs 158 melt to form a weld seam between the bottom surface 136 of the body portion 118 and the second end surface 150 of the pre-chamber 120. The melting of the sacrificial tabs 158 leads to attachment of the bottom surface 136 of the body portion 118 with the second end surface 150 of the pre-chamber 120. In one example, the predetermined temperature is the melting point of the material of the pre-chamber 120. The predetermined temperature may depend on the predefined height and the predefined thickness of the sacrificial tabs 158. The predetermined electric current applied to the sacrificial tabs 158 is determined based on the material of the sacrificial tabs 158 and the material of the body portion 118. In an example, the predetermined electric current may be in a range of 10 amperes to 100,000 amperes.

Figure 6:
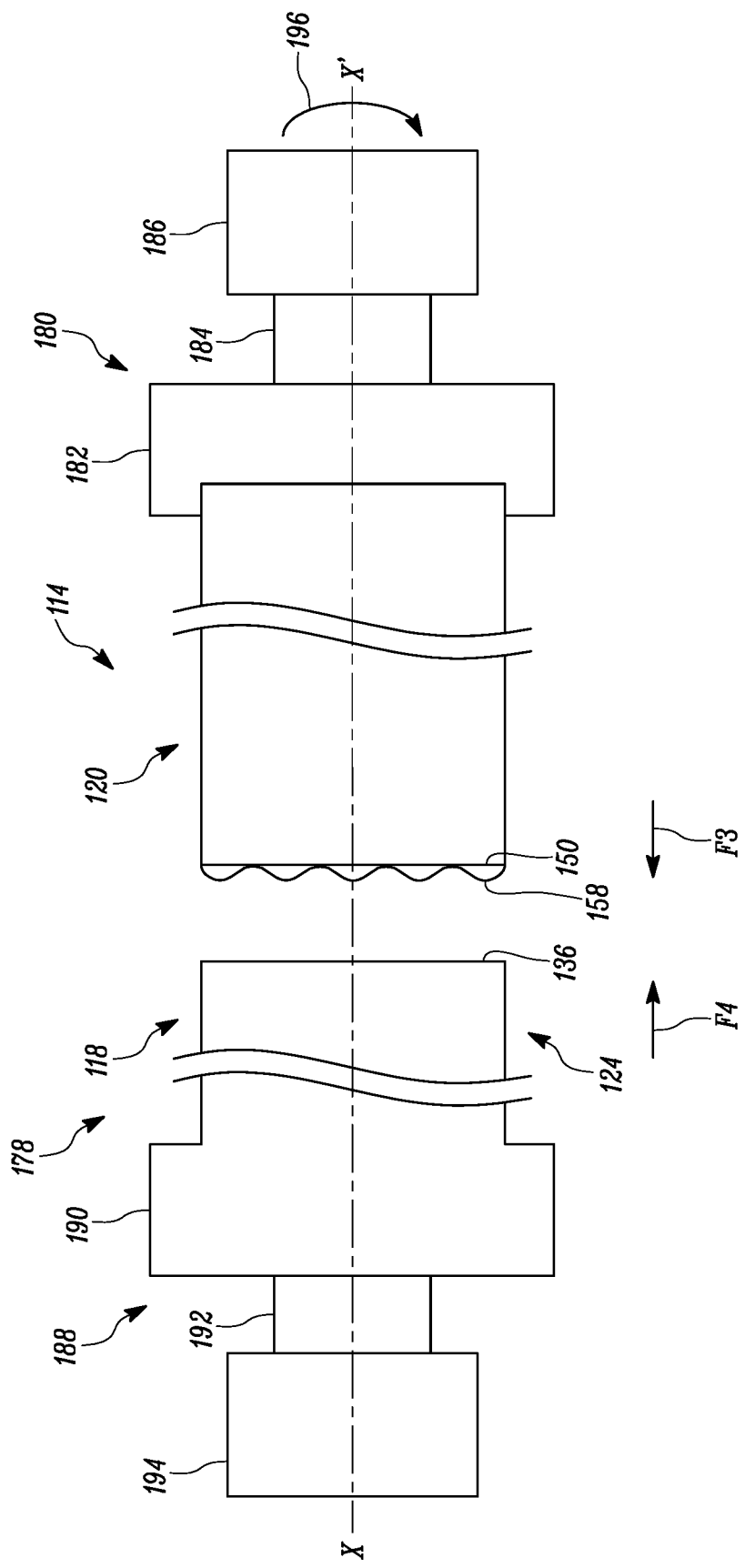
FIG. 6 is a schematic view of an exemplary set up for manufacturing the pre-chamber assembly via friction welding, according to yet another embodiment of the present disclosure.

Referring to FIG. 6, an exemplary system 178 for manufacturing the pre-chamber assembly 114 via friction welding is shown. For the sake of brevity, the present disclosure will be described in connection to the sacrificial tabs 158 of the pre-chamber 120, although it will be understood that the present disclosure is also applicable to the sacrificial tabs 162 present at the body portion 118 as described in FIG. 4.

The system 178 includes a first holding member 180 for holding the pre-chamber 120. The first holding member 180 has a sleeve 182 for holding the pre-chamber 120 along the longitudinal axis X-X'. The sleeve 182 is attached to an elongated portion 184. The elongated portion 184 is rotatably coupled to a motor 186 for providing a rotational motion, as illustrated in FIG. 6. The motor 186 provides a rotational motion at a predetermined RPM (Revolutions Per Minute) to the first holding member 180. However, it may be understood by the person skilled in the art, the elongated portion 184 can be coupled to any device including, but not limited to, a flywheel that can impart the predetermined RPM to the first holding member 180.

The system 178 further includes a second holding member 188. The second holding member 188 has a sleeve 190 for holding the body portion 118 along the longitudinal axis X-X'. The sleeve 190 is attached to an elongated portion 192 rigidly coupled to the second holding member 188. The second holding member 188 may be attached to a hydraulic system 194 for immovably holding the body portion 118. In another example, the second holding member 188 may be attached to a pneumatic system (not shown) for immovably holding the body portion 118. In another embodiment, the motor 186 is connected to the second holding member 188 and the hydraulic system 194 is connected to the first holding member 180.

The system 178 is adapted to connect the sacrificial tabs 158 of the pre-chamber 120 and the bottom surface 136 of the body portion 118. More specifically, the system 178 is provided for performing a welding process, such as a friction welding process, to fuse the sacrificial tabs 158 with the bottom surface 136 of the body portion 118. In order to perform the welding process, the pre-chamber 120 and the body portion 118 are aligned along the longitudinal axis X-X'. Further, the system 178 is configured to apply a predetermined axial force on the pre-chamber 120 and the body portion 118 along the longitudinal axis X-X' to induce a pressure between the body portion 118 and the pre-chamber 120. More specifically, the system 178 may apply a predetermined axial force F3 towards the body portion 118 opposite to a direction of the longitudinal axis X-X'. The system 178 may apply a predetermined axial force F4 in an opposite direction of the predetermined axial force 'F3' on the body portion 118 towards the pre-chamber 120 along the longitudinal axis X-X'.

During a welding process, the pre-chamber 120 is rotated at the predetermined RPM through the motor 186 connected to the first holding member 180. The predetermined RPM is determined based on the dimensional characteristics of the sacrificial tabs 158 such as the predefined height and the predefined thickness of the sacrificial tabs 158. The predetermined RPM is applied on the sacrificial tabs 158 in a predefined direction 196 through the motor 186. The predefined direction 196 is selected based on various parameters. The various parameters may include, but are not limited to, dimensional characteristics, such as the shape, the predefined thickness and the predefined height, of the sacrificial tabs 158. The predetermined RPM and the predetermined axial force are applied to the sacrificial tabs 158 to aid the melting of the sacrificial tabs 158. In one example, the second holding member 188 rotates the pre-chamber 120 at a particular RPM, such that the sacrificial tabs 158 melt at a temperature generated due to a frictional force developed due to the predetermined axial force and the rotation of the pre-chamber 120. The melted sacrificial tabs 158 form a weld seam between the bottom surface 136 of the body portion 118 and the second end surface 150 of the pre-chamber 120. It will be appreciated that the pre-chamber 120 may be attached to the body portion 118 by any type of friction welding process known to the person skilled in the art.

It may be understood that the body portion 118 can be connected to the first holding member 180 if the sacrificial tabs 162 are present at the bottom surface 136 of the body portion 118. In such a scenario, the pre-chamber 120 is held by the second holding member 188. The body portion 118 is rotated at the predetermined RPM to fuse the sacrificial tabs 162 of the body portion 118 to attach with the second end surface 150 of the pre-chamber 120.

INDUSTRIAL APPLICABILITY

The pre-chamber assembly 114 and a method 198 of joining the body portion 118 of the fuel injector 112 with the pre-chamber 120 114 are disclosed. The pre-chamber 120 includes the sacrificial tabs 158 disposed at the second end surface 150 of the cylindrical body member 140. The sacrificial tabs 158 are configured to melt so as to attach the pre-chamber 120 with the body portion 118 by at least one of the resistance welding and the friction welding. The sacrificial tabs 158 melts and forms a weld seam between the bottom surface 136 of the body portion 118 and the second end surface 150 of the pre-chamber 120. In order to melt the sacrificial tabs 158, a melting point of the material of the sacrificial tabs 158 are identified and the sacrificial tabs 158 are connected to the system 164, 178 for performing the resistance welding and/or the friction welding. The present disclosure offers a simple, effective and economical method for manufacturing the pre-chamber assembly 114. More specifically, the present disclosure offers an effective and economical method of joining the pre-chamber 120 with the body portion 118. The sacrificial tabs 158 welded to the bottom surface 136 of the body portion 118 provide effective sealing between the body portion 118 and the pre-chamber 120. Thus, the weld seam formed between the pre-chamber 120 and the body portion 118 eliminates leakage of the air fuel mixture to other portions of the cylinder block 106. The sacrificial tabs 158 have same material of the cylindrical body member 140 and the bottom plate 142 of the pre-chamber 120, and hence a requirement of a third material as the weld seam is discarded, thereby providing increased strength of joint between the pre-chamber 120 and the body portion 118.

Figure 7:
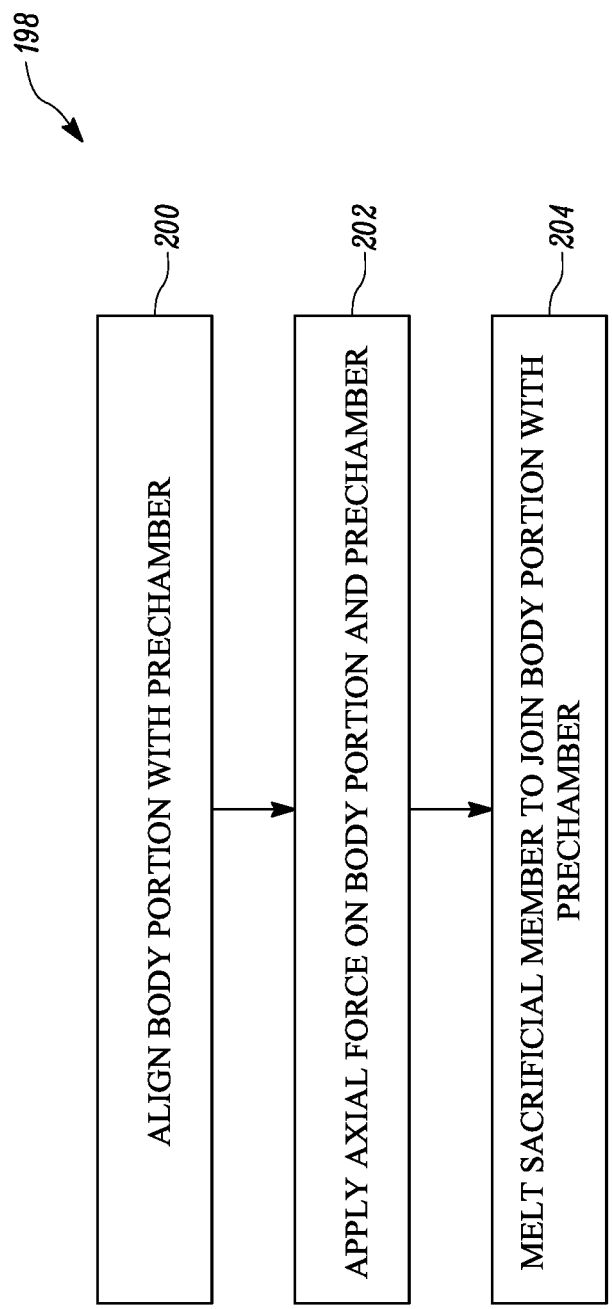
FIG. 7 is a flow diagram of a method of joining a body portion of the fuel injector with the pre-chamber, according to one embodiment of the present disclosure.

FIG. 7 is flow diagram illustrating the method 198 of joining the body portion 118 of the fuel injector 112 with the pre-chamber 120. For the sake of brevity, the aspects of the present disclosure which are already explained in detail in the description of FIG. 1, FIG. 2, FIG. 3, and FIG. 4 are not explained in detail with regard to the description of the method 198.

At step 200, the method 198 of joining the body portion 118 of the fuel injector 112 with the pre-chamber 120 includes aligning the body portion 118 with the pre-chamber 120 along the longitudinal axis X-X'. The bottom end portion 124 of the body portion 118 is brought proximal to the sacrificial tabs 158 of the pre-chamber 120.

At step 202, the method 198 includes applying the predetermined axial forces F1 on the body portion 118 and the predetermined axial forces F2 on pre-chamber 120. The predetermined axial force may be applied along the longitudinal axis X-X' for introducing the pressure at contact between the bottom surface 136 of the body portion 118 and the sacrificial tabs 158 of the pre-chamber 120.

At step 204, the method 198 includes melting the sacrificial member 160 of the pre-chamber 120 in order to attach the pre-chamber 120 with the body portion 118. In one embodiment, the resistance welding process is used for joining the pre-chamber 120 with the body portion 118 by melting of the sacrificial member 144. The resistance welding process includes applying the predefined electric current to the body portion 118 and the pre-chamber 120 for the predefined time as explained in detail with reference to FIG. 5. In another embodiment, the friction welding process is used for joining the pre-chamber 120 with the body portion 118 by melting of the sacrificial member 144. The friction welding process includes rotating at least one of the body portion 118 and the pre-chamber 120 as explained in detail with reference to FIG. 6.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A pre-chamber for a pre-chamber assembly in an engine comprising:
   a cylindrical body member defining a longitudinal central axis, the cylindrical body member having a circular cross-section and extending axially from a first end portion to a second end portion opposite to the first end portion;
   the cylindrical body member further having a wall defined between an inner surface and an outer surface of the cylindrical body member, and ports are formed in the wall and connect to a chamber that extends axially between the first end portion and the second end portion and forms an opening in the second end portion;
   a bottom plate located proximal to the first end portion of the cylindrical body member, wherein the bottom plate is free of any openings and faces a first direction; and
   a sacrificial member having a circular configuration in an end view of the cylindrical body member and extending axially outwardly from an end surface of the second end portion of the cylindrical body member in a second direction opposite the first direction,
   wherein the sacrificial member includes a plurality of sacrificial tabs, each of the sacrificial tabs extending axially outward from the end surface of the second end portion of the cylindrical body member,
   wherein the plurality of sacrificial tabs have peaks spaced apart at an equal distance from each other about the end surface of the second end portion of the cylindrical body,
   wherein the plurality of sacrificial tabs are of a predefined thickness, the predefined thickness being less than a thickness of the cylindrical body member,
   wherein the plurality of sacrificial tabs are offset radially inward from an outer surface of the second end portion of the cylindrical body member,
   wherein the sacrificial member and the cylindrical body member are formed as one piece, and the sacrificial member is centered on the longitudinal central axis, extends circumferentially around the opening to the chamber, and forms a tip of the cylindrical body member, wherein the plurality of sacrificial tabs are configured to melt at a predefined temperature caused by a predetermined frictional force applied to the plurality of sacrificial tabs generated by a predetermined axial force applied to the pre-chamber and a predetermined rotation applied to the pre-chamber.

2. The pre-chamber of claim 1, wherein the sacrificial member is configured to melt at the predefined temperature to attach with a bottom surface of a body portion of a pre-chamber assembly.

3. The pre-chamber of claim 2, wherein the sacrificial member is configured to melt by at least one of a resistance welding and a friction welding to attach with the bottom surface of the body portion of the pre-chamber assembly.

4. The pre-chamber of claim 1, wherein the sacrificial member has a predefined height and the predefined thickness.

5. The pre-chamber of claim 1, wherein each of the plurality of sacrificial tabs is semicircular in shape.

6. The pre-chamber of claim 1, wherein the first end portion includes the ports.

7. A pre-chamber assembly for an engine, the fuel injector comprising:
   a body portion adapted to receive fuel from a fuel supply system of the engine, the body portion having a bottom surface; and
   a pre-chamber structured to be attached to the bottom surface of the body portion, the pre-chamber including:
      a cylindrical body member defining a longitudinal central axis, the cylindrical body member having a circular cross-section and extending axially from a first end portion to a second end portion opposite to the first end portion,
      a bottom plate located proximal to the first end portion of the cylindrical body member, wherein the bottom plate is free of any openings and faces a first direction, and
      a sacrificial member having a circular configuration in an end view of the cylindrical body member and extending axially outwardly from an end of the second end portion of the cylindrical body member in a second direction opposite the first direction,
   wherein the sacrificial member includes a plurality of sacrificial tabs, each of the sacrificial tabs extending axially outward from the end of the second end portion of the cylindrical body member,
   wherein the plurality of sacrificial tabs have peaks spaced apart at an equal distance from each other about the end of the second end portion of the cylindrical body member,
   wherein the plurality of sacrificial tabs are of a predefined thickness, the predefined thickness being less than a thickness of the cylindrical body member,
   wherein the plurality of sacrificial tabs are offset radially inward from an outer surface of the second end portion of the cylindrical body member,
   wherein the sacrificial member and the cylindrical body member are formed as one piece, and
   wherein the plurality of sacrificial tabs are configured to melt at a predefined temperature caused by a predetermined frictional force applied to the plurality of sacrificial tabs generated by a predetermined axial force applied to the pre-chamber and a predetermined rotation applied to the pre-chamber,
   wherein the body portion and the cylindrical body member of the pre-chamber are held in coaxial alignment and the sacrificial member projects toward the bottom surface of the body portion.

8. The pre-chamber assembly of claim 7, wherein the sacrificial member is configured to melt at the predefined temperature to attach with the bottom surface of the body portion.

9. The pre-chamber assembly of claim 8, wherein the sacrificial member is configured to melt by at least one of a resistance welding and a friction welding to attach with the bottom surface to the body portion of the pre-chamber assembly.

10. The pre-chamber assembly of claim 7, wherein the sacrificial member has a predefined height and the predefined thickness.

11. The pre-chamber assembly of claim 7, wherein each of the plurality of sacrificial tabs is semicircular in shape.

12. A pre-chamber for a pre-chamber assembly in an engine, the pre-chamber comprising:
   a cylindrical body member defining a longitudinal central axis, the cylindrical body member having a circular cross-section and extending axially from a first end portion to a second end portion opposite to the first end portion;
   the cylindrical body member further having a wall defined between an inner surface and an outer surface of the cylindrical body member, and ports are formed in the wall and connect to a chamber that extends axially between the first end portion and the second end portion and forms an opening at the second end portion;
   a bottom plate located proximal to the first end portion of the cylindrical body member, wherein the bottom plate is free of any openings and faces a first direction; and
   a sacrificial member having a circular configuration in an end view of the cylindrical body member and extending axially outwardly from an end surface of the second end portion of the cylindrical body member in a second direction opposite the first direction,
   wherein the sacrificial member is centered on the longitudinal central axis, extends circumferentially around the opening to the chamber, and forms a tip of the cylindrical body member,
   wherein the sacrificial member includes a plurality of sacrificial tabs, each of the sacrificial tabs extending axially outward from the end surface of the second end portion of the cylindrical body member,
   wherein the plurality of sacrificial tabs have peaks spaced apart at an equal distance from each other about the end surface of the second end portion of the cylindrical body,
   wherein the plurality of sacrificial tabs are configured to melt at a predefined temperature caused by a predetermined frictional force applied to the plurality of sacrificial tabs generated by a predetermined axial force applied to the pre-chamber and a predetermined rotation applied to the pre-chamber.

13. The pre-chamber of claim 12, wherein the plurality of sacrificial tabs are of a predefined thickness, the predefined thickness being less than a thickness of the cylindrical body member.

14. The pre-chamber of claim 12, wherein the plurality of sacrificial tabs are offset radially inward from an outer surface of the second end portion of the cylindrical body member.

15. The pre-chamber of claim 12, wherein the sacrificial member and the cylindrical body member are formed as one piece.

* * * * *